(No Model.)

W. D. NELSON.
GREASE EXTRACTOR.

No. 395,401. Patented Jan. 1, 1889.

Witnesses.
Thos. Houghton.
Jas. W. Dyer.

Inventor.
W. D. Nelson,
By his Attorney
F. W. Barker

UNITED STATES PATENT OFFICE.

WILLIAM DANIEL NELSON, OF SAN FRANCISCO, CALIFORNIA.

GREASE-EXTRACTOR.

SPECIFICATION forming part of Letters Patent No. 395,401, dated January 1, 1889.

Application filed June 12, 1888. Serial No. 276,812. (No model.)

*To all whom it may concern:*

Be it known that I, WILLIAM DANIEL NELSON, a citizen of the United States, residing at San Francisco, in the county of San Francisco and State of California, have invented a new and useful Improvement in Oil-Traps or Feed-Water Grease-Extractors, of which the following is a specification.

My invention is an improvement on the device for removing grease and other extraneous matter from feed-water for which United States Letters Patent No. 366,864 were issued to me on the 19th day of July, 1887, and relates to oil-traps or feed-water grease-extractors for marine or stationary boilers, in which I have constructed suitable devices and mechanism for extracting oil or grease that is used in cylinders of condensing-engines and preventing its entering the boiler with the feed-water.

Figure 1:
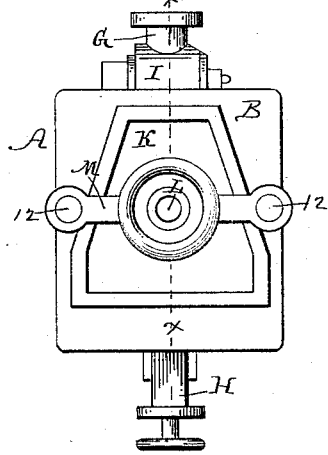
Figure 2:
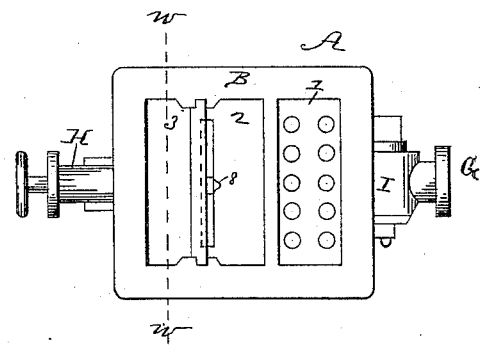
Figure 3:
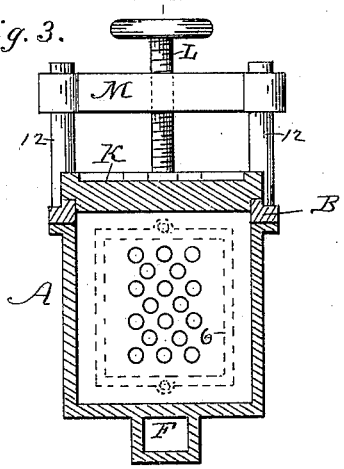
Figure 4:
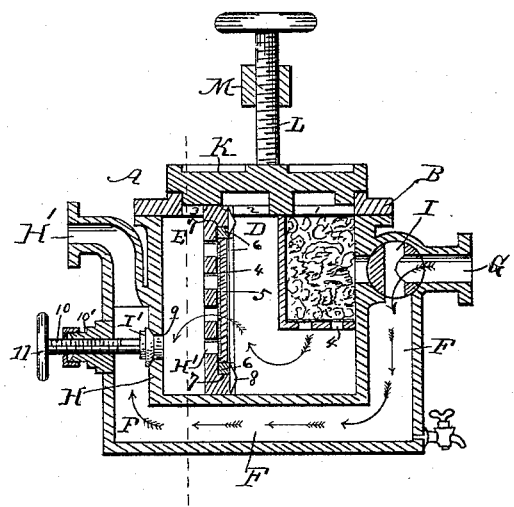

Figure 1 is a top view of my improved oil-trap or feed-water grease-extractor. Fig. 2 is a similar view with the cover removed. Fig. 3 is a vertical section on line $w\ w$ of Fig. 2. Fig. 4 is a vertical section on line $x\ x$ of Fig. 1.

Similar letters of reference refer to similar parts in all the figures.

The object of my invention is to provide for a change of the filtering devices and materials while the engine is running without cutting off the supply of feed-water. This object I attain by the novel arrangement of parts hereinafter described, and more particularly pointed out in the claim.

A is a cast-iron or other suitable box, preferably of the shape and proportions shown in the accompanying drawings, and of any convenient size to suit the size of the steam-boiler with which it is to be used.

B is the top of the trap, provided with openings 1 2 3, leading to three communicating chambers, C D E, of the trap.

F is a conduit for the feed-water to flow through when the screens or filtering material require changing during the running of the engine.

G is the inlet-pipe, and H is the outlet from the trap.

I is a two-way valve connecting the inlet G with the filtering-chamber C when the water is to be filtered from oil or grease which it may contain. Chamber C has perforations 4 or a grated bottom, and is filled with curled hair, horse-hair, cotton, wool, sponges, and pulverized glass. I sometimes use one of the above-named filtering materials alone, and sometimes two or more of them together, according to the amount of oil or grease in the water.

When I use pulverized glass in chamber C, I place a layer of sponge next to the perforated bottom to keep the glass from being washed through the bottom of the chamber. Chambers D and E are separated by a perforated wall, H', wire-gauze screen 4, and flannel screen 5. Said screens are held in place by a frame, 6, fitting into a suitable recess, 7, in the perforated wall H', and is secured thereto by bolts or screws 8.

I' is a conical valve fitting water-tight into its seat 9 in wall H. The stem 10 of valve I' passes across the conduit F through a stuffing-box, 10', in the well-known manner. Valve I' is worked by a hand-wheel, 11. K is a tightly-fitting cover, securely fastened in position by a central hand-screw, L, seated in a cross-bar, M, which is supported on pillars 12, as shown in Figs. 1, 3, and 4.

In use my invention operates as follows: The water to be cleaned of oil or grease enters the trap through inlet G, passes through the filtering material in chamber C, thence through the perforated or grated bottom 4 into chamber D, from chamber D through flannel screen 5, wire-gauze screen 4, and perforated screen or wall H' into chamber E. From chamber E the purified water is allowed to pass to the outlet H. Whenever it is desirable to change the filtering material contained in the chamber C or the flannel screen, or any of the other screens, or to remove sediment or refuse from chamber C or D, I first turn the two-way valve to the position shown in Fig. 4, and close valve I', as shown in the same figure. This will cause the feed-water to pass through conduit F during the cleaning of the filter or trap. Then I have only to loosen hand-screw L. This will enable me to remove cover K. Then I remove the greasy filtering material and screens before described and replace the same with new or clean ones. The cover is then replaced, the hand-screw L is screwed down, and valves I and I' returned to their former positions, so as to cause the feed-water to pass through chambers C D E into outlet H', and the filtering devices are again in good working order.

I do not claim, broadly, an auxiliary conduit for the feed-water to pass through, as that feature is shown in other patents.

What I claim as my invention, and desire to secure by Letters Patent, is—

In a feed-water oil and grease extractor, the combination of the two-way cock I with filtering-chamber C and auxiliary passage or conduit F, valve I', chambers D and E, separated by filtering-screens, and the outlet-pipe H', as herein set forth.

WILLIAM DANIEL NELSON.

Witnesses:
OTIS V. SAWYER,
JNO. R. HILLMAN.